(12) United States Patent
Yamagishi et al.

(10) Patent No.: US 9,915,418 B2
(45) Date of Patent: Mar. 13, 2018

(54) PHOSPHOR WHEEL, ILLUMINATION APPARATUS AND PROJECTION TYPE IMAGE DISPLAY APPARATUS

(71) Applicant: PANASONIC INTELLECTUAL PROPERTY MANAGEMENT CO., LTD., Osaka (JP)

(72) Inventors: Shigekazu Yamagishi, Osaka (JP); Manabu Chikayama, Osaka (JP); Naoya Kitade, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/385,384

(22) Filed: Dec. 20, 2016

(65) Prior Publication Data

US 2017/0175989 A1    Jun. 22, 2017

(30) Foreign Application Priority Data

Dec. 22, 2015    (JP) .................................. 2015-250133

(51) Int. Cl.
| | |
|---|---|
| G03B 21/16 | (2006.01) |
| F21V 29/502 | (2015.01) |
| G02B 26/00 | (2006.01) |
| G03B 21/20 | (2006.01) |
| F21V 9/16 | (2006.01) |
| F21V 29/74 | (2015.01) |
| F21V 29/67 | (2015.01) |
| G03B 21/00 | (2006.01) |

(52) U.S. Cl.
CPC ............. *F21V 29/502* (2015.01); *F21V 9/16* (2013.01); *F21V 29/67* (2015.01); *F21V 29/745* (2015.01); *G02B 26/008* (2013.01); *G03B 21/16* (2013.01); *G03B 21/204* (2013.01); *G03B 21/008* (2013.01)

(58) Field of Classification Search
CPC  G03B 21/204; G03B 21/208; G03B 21/2033; F21V 29/70; F21V 29/85; F21V 29/89; F21V 29/502; F21V 29/503
See application file for complete search history.

(56) References Cited

U.S. PATENT DOCUMENTS

| | | | |
|---|---|---|---|
| 2012/0242912 A1* | 9/2012 | Kitano | H04N 9/3111 348/759 |
| 2013/0038847 A1* | 2/2013 | Katou | G02B 5/26 353/98 |
| 2013/0169938 A1* | 7/2013 | Huang | G03B 21/16 353/31 |

(Continued)

FOREIGN PATENT DOCUMENTS

| | | |
|---|---|---|
| JP | 2012-013897 A | 1/2012 |
| JP | 2013-069547 A | 4/2013 |

*Primary Examiner* — Sultan Chowdhury
(74) *Attorney, Agent, or Firm* — McDermott Will & Emery LLP (57) ABSTRACT

A disk-shaped substrate made of a heat conductive material is provided with, along an outer periphery of one surface of the substrate, a ring-shaped phosphor that emits light by irradiation with blue laser light that is excitation light. The substrate is provided with, on another surface of the substrate, a plurality of convex portions dotting a region corresponding to a region provided with the phosphor. In a phosphor wheel, the substrate is driven by a motor to rotate about an axis of rotation.

14 Claims, 10 Drawing Sheets

(56) References Cited

U.S. PATENT DOCUMENTS

| | | | | |
|---|---|---|---|---|
| 2014/0362350 A1* | 12/2014 | Takamatsu | ......... | G02B 19/0023 353/31 |
| 2015/0219984 A1* | 8/2015 | Matsubara | ........... | G02B 26/008 353/31 |
| 2016/0077325 A1* | 3/2016 | Tsai | ..................... | G02B 26/008 353/31 |
| 2017/0293211 A1* | 10/2017 | Kobayashi | ............. | G03B 21/16 |

* cited by examiner

PHOSPHOR WHEEL, ILLUMINATION APPARATUS AND PROJECTION TYPE IMAGE DISPLAY APPARATUS

RELATED APPLICATIONS

This application claims the benefit of Japanese Application No. 2015-250133, filed on Dec. 22, 2015, the disclosure of which Application is incorporated by reference herein.

BACKGROUND

1. Technical Field

The present disclosure relates to a phosphor wheel for use in, for example, an illumination apparatus of a projection type image display apparatus.

2. Description of the Related Art

A technique disclosed in Unexamined Japanese Patent Publication No. 2013-69547 relates to a heat dissipating substrate for a phosphor that includes an uneven structure as a back surface of a metal-impregnated carbon-based substrate, and this uneven structure has widths ranging from nanometer order to submicrometer order.

SUMMARY

The present disclosure provides a phosphor wheel capable of effectively dissipating heat generated in a phosphor substrate.

A phosphor wheel according to the present disclosure includes a disk-shaped substrate made of a heat conductive material, the substrate including a phosphor that emits light by irradiation with excitation light in a first region along an outer periphery of one surface of the substrate, and a plurality of convex portions dotting a second region of another surface of the substrate, the second region corresponding to the first region, wherein the substrate is driven to rotate about an axis of rotation.

The phosphor wheel of the present disclosure can efficiently cool the heated phosphor with a simple structure.

DETAILED DESCRIPTION

Exemplary embodiments are described hereinafter with reference to the accompanying drawings, as required. It is to be noted that detailed descriptions that are more than necessary may be omitted. For example, there are cases where detailed description of well-known matters and repeated description of substantially the same structure are omitted for the purpose of preventing the following description from needlessly having redundancy, thereby facilitating understanding by those skilled in the art.

It is also to be noted that the accompanying drawings and the following description are provided to allow those skilled in the art to sufficiently understand the present disclosure and thus are not intended to limit subject matters described in the claims.

First Exemplary Embodiment

With reference to FIGS. 1 to 5B, a description will be given hereinafter of an illumination apparatus using a phosphor wheel according to the first exemplary embodiment.

Figure 1:
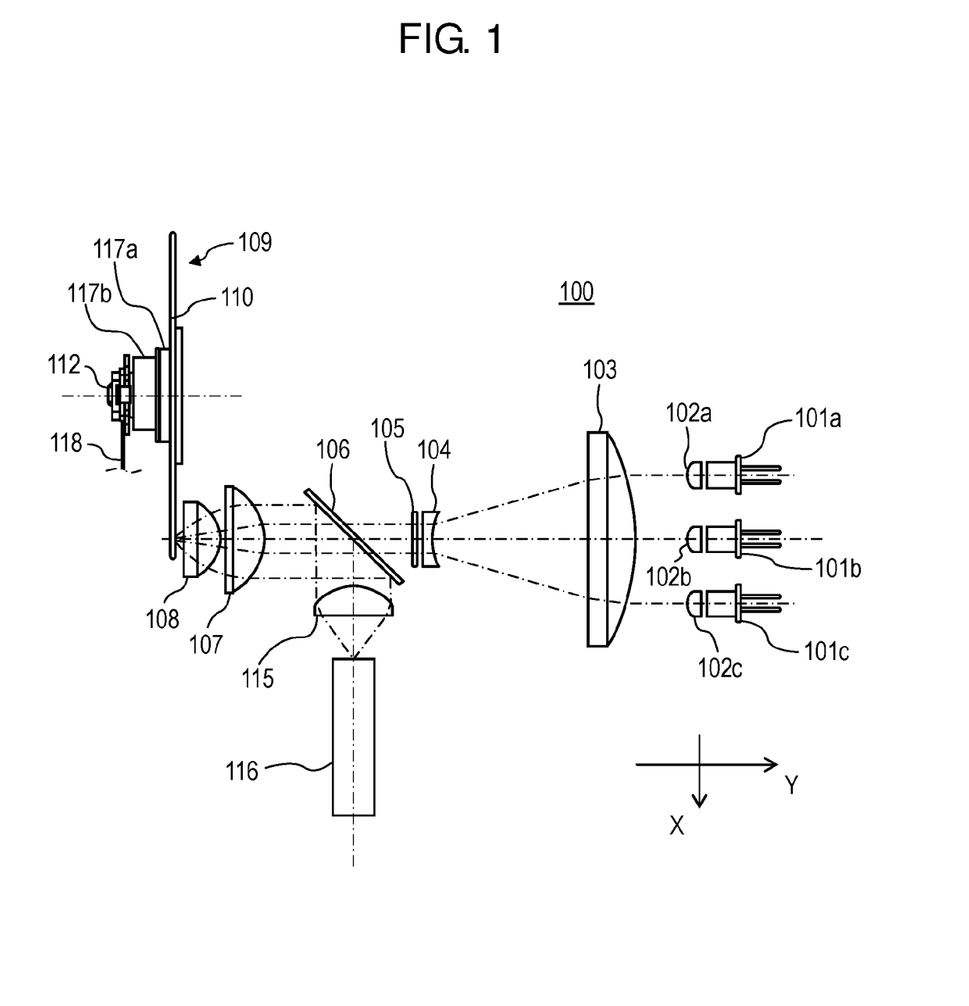
FIG. 1 illustrates an illumination apparatus using a phosphor wheel according to a first exemplary embodiment.
Figure 2:
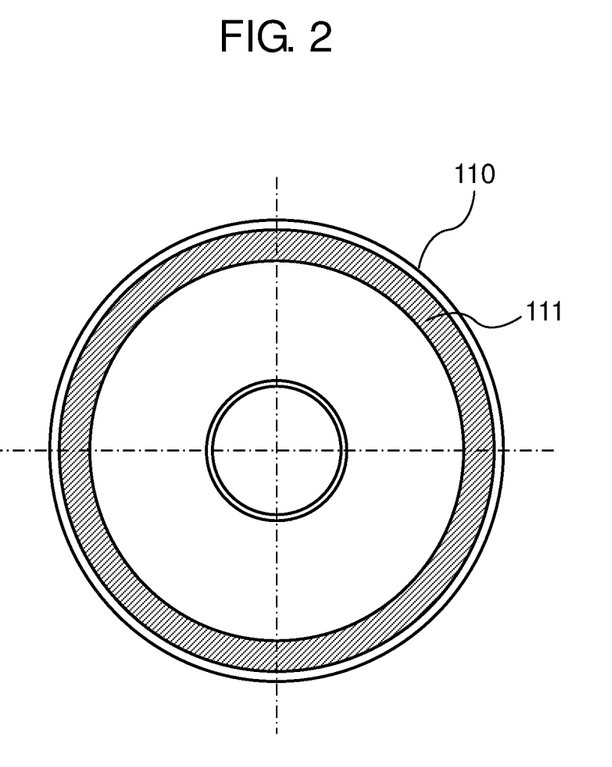
FIG. 2 is a front view of the phosphor wheel.
Figure 3A:
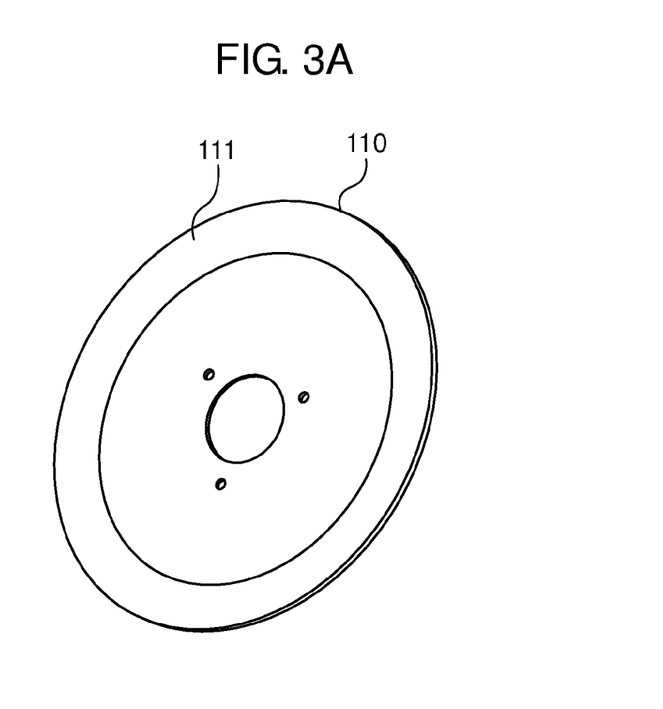
FIG. 3A is a perspective view illustrating a front side of a substrate of the phosphor wheel.
Figure 3B:
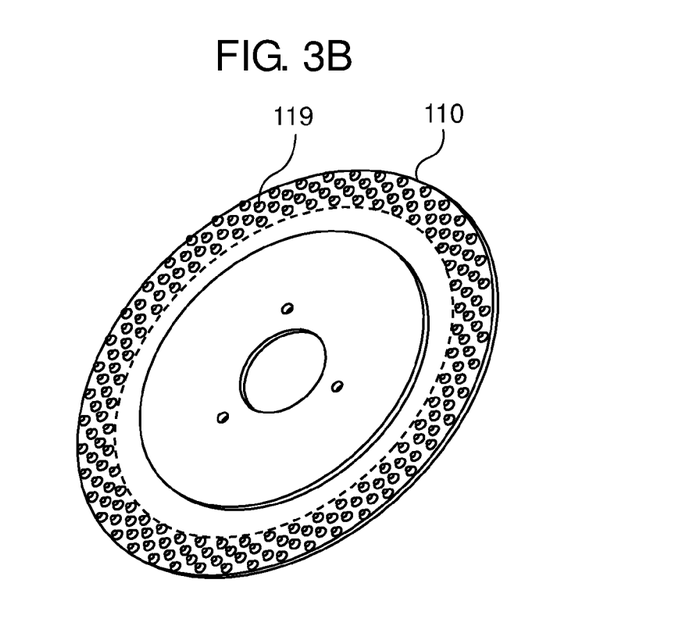
FIG. 3B is a perspective view illustrating a back side of the substrate of the phosphor wheel.
Figure 4A:
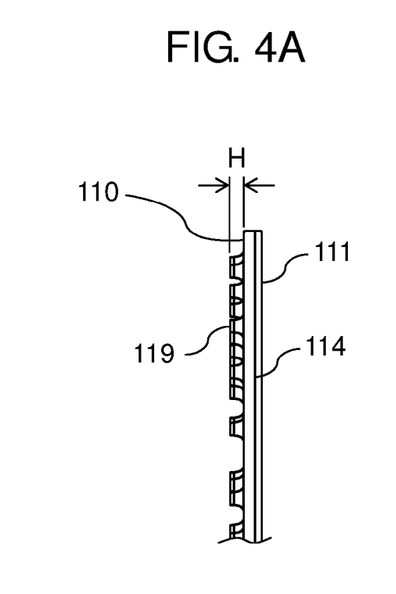
FIG. 4A is an enlarged view illustrating a side edge of the substrate of the phosphor wheel.
Figure 4B:
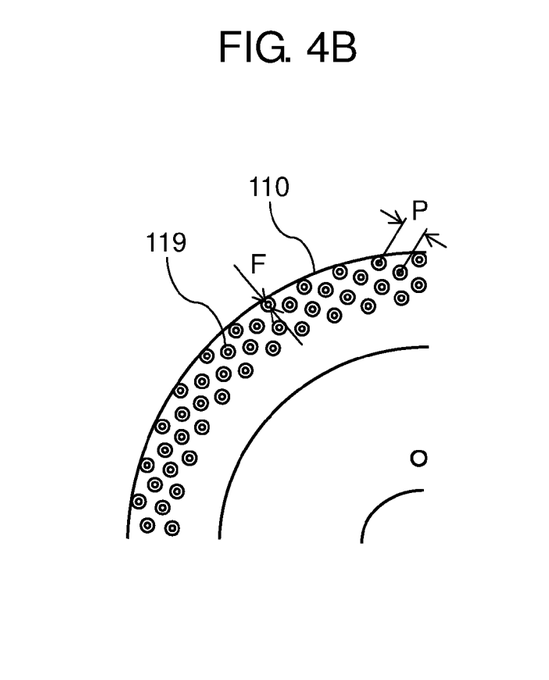
FIG. 4B is an enlarged view illustrating the back side of the substrate of the phosphor wheel.
Figure 5A:
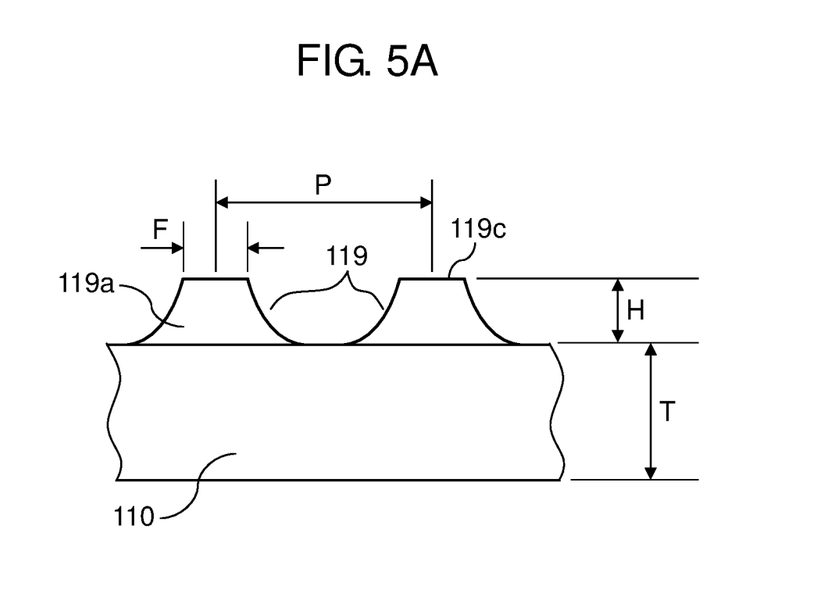
FIG. 5A is an enlarged view of convex portions on the substrate of the phosphor wheel.
Figure 5B:
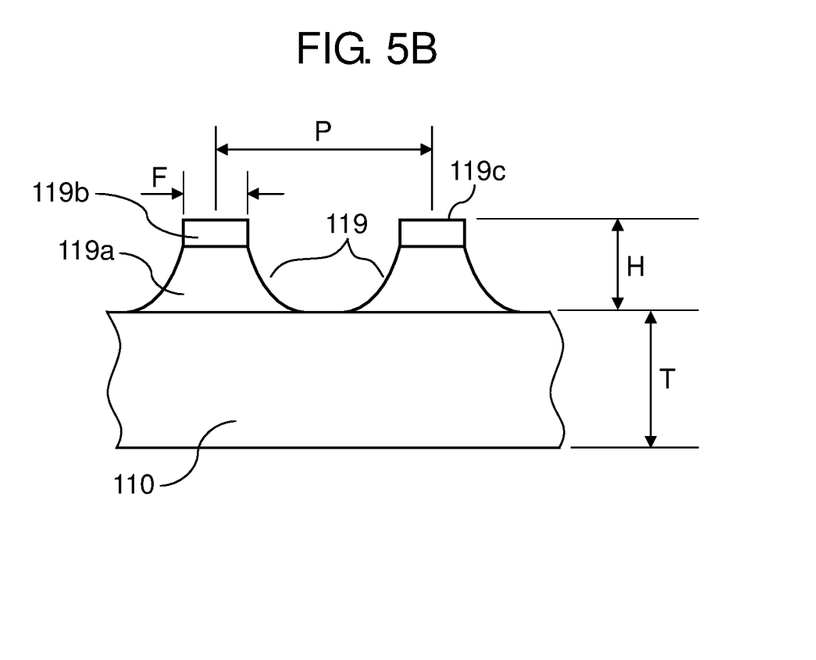
FIG. 5B is an enlarged view of convex portions on the substrate of the phosphor wheel.

FIG. 1 illustrates a structure of illumination apparatus 100 according to the first exemplary embodiment. FIG. 2 is a plan view illustrating a front side of a substrate of the phosphor wheel. FIG. 3A is a perspective view of the front side of the substrate provided with a phosphor in the phosphor wheel. FIG. 3B is a perspective view of a back side of the substrate provided with the phosphor in the phosphor wheel. FIG. 4A is an enlarged view of a side edge of the substrate provided with the phosphor in the phosphor wheel. FIG. 4B is an enlarged view illustrating a portion of the back side of the substrate included in the phosphor wheel. FIGS. 5A and 5B are enlarged views each illustrating convex portions of the substrate.

In illumination apparatus 100 shown in FIG. 1, blue laser diodes 101a, 101b, 101c are excitation light sources that each emit blue laser light in a negative Y direction. The emitted blue light is collimated by collimating lenses 102a, 102b, 102c. The collimated blue light is converged by an afocal optical system that is formed of lens 103 and lens 104, thus being brought into incidence on diffusion plate 105. The blue light incident on diffusion plate 105 is diffused by diffusion plate 105 and then is incident on dichroic mirror 106. Dichroic mirror 106 transmits blue light and reflects visible light other than the blue light.

Dichroic mirror 106 is disposed to incline at 45 degrees to an optical axis and transmits the blue light incident from diffusion plate 105. The blue light passes through first lens 107 and second lens 108 and is applied to phosphor 111. Phosphor 111 is provided along an outer periphery of one surface of disk-shaped substrate 110 included in phosphor wheel 109, thus having the shape of a ring.

Substrate 110 of phosphor wheel 109 is driven by motor 112 to rotate, so that phosphor 111 provided on substrate 110 rotates accordingly. As phosphor 111 rotates, a blue light incident position in phosphor 111 changes with time, so that an area of phosphor 111 that is heated by the blue light can be increased. Consequently, increase in temperature of phosphor 111 can be suppressed even when the applied blue light has high energy.

Phosphor 111 emits yellow fluorescence by having the applied blue light as excitation light. The yellow light emitted by phosphor 111 is directed in a positive Y direction. The yellow light emitted in the negative Y direction is reflected by highly reflective film 114 provided on substrate 110, thus being redirected in the positive Y direction. Thereafter, the yellow light is incident on dichroic mirror 106 and is reflected by dichroic mirror 106 that reflects the visible light other than the blue light, thus travelling in a positive X direction. The yellow light is incident on lens 115, thereby being concentrated on an incidence surface of rod integrator 116 that is disposed on an emission surface side of lens 115 and has a rectangular aperture.

In this way, the yellow light can be generated through use of the blue laser light as the excitation light. In this structure, emitted light can be obtained from an emission side of rod integrator 116. An optical system is provided next to the emission surface side of rod integrator 116, and the emitted light is brought into incidence on this optical system, as needed. It is to be noted that a lens array formed of rectangular lenses may be used in place of lens 115 and rod integrator 116. Semiconductor lasers 101a, 101b, 101c and collimating lenses 102a, 102b, 102c form an excitation light source apparatus. Lens 103, lens 104, diffusion plate 105, dichroic mirror 106, first lens 107 and second lens 108 form an excitation optical system. Illumination apparatus 100 is thus configured of the excitation light source apparatus and the excitation optical system.

A detailed description will be given of a structure of phosphor wheel 109. As described above, phosphor 111 is formed on the one surface of substrate 110 to have the ring shape. Specifically, ring-shaped phosphor 111 is formed to have a predetermined width astride a circumference spaced a predetermined distance away from a center of substrate 110. Phosphor 111 can be formed by mixing phosphor powder and thermosetting resin, applying a resulting mixture to substrate 110 by screen printing and thereafter heating and curing the applied mixture in a heating furnace. The phosphor powder emits yellow light by having blue light as excitation light.

In a system that is required to produce output with high brightness, such as the illumination apparatus, high energy is required to excitation light for excitation of a phosphor. When the phosphor emits fluorescence by absorbing the excitation light, about a half of the energy of the excitation light becomes energy for the fluorescence, but the other half of the energy becomes heat. Accordingly, the phosphor becomes extremely hot during irradiation with intense excitation light. On the other hand, when the phosphor gets too hot, its light emitting efficiency deteriorates due to temperature quenching. This means that the output of the system has reduced brightness. For this reason, a structure for efficient dissipation of heat of the phosphor is demanded. It is therefore preferable from a viewpoint of heat dissipation that a heat conductive material is used for substrate 110 of phosphor wheel 109. In phosphor wheel 109 of the first exemplary embodiment, the heat conductive material used for substrate 110 is an aluminum material. The heat conductive material used for substrate 110 is not limited to the aluminum material. Any material that has satisfactory heat conductivity and is readily processed to form a substrate can be used as the heat conductive material.

Phosphor wheel 109 is mounted with motor 112 for driving substrate 110 to rotate. This motor 112 is an outer rotor motor including rotor 117a and stator 117b. Rotor 117a is provided on a surface of substrate 110 that is opposite to the surface on which phosphor 111 is formed. Stator 117b is fixed to a support member (not shown in the drawing) that supports phosphor wheel 109. Electric power is supplied to stator 117b via flexible substrate 118 for driving motor 112, so that rotor 117a is driven by motor 112 to rotate.

As shown in FIG. 3A, substrate 110 of the present exemplary embodiment has phosphor 111 that is coated to the one surface of substrate 110 to have the ring shape. Here, a region coated with phosphor 111 is a first region. On the back side of substrate 110 that is opposite to the surface coated with phosphor 111, a region corresponding to the first region is a second region. In other words, the first region and the second region face each other across substrate 110. The second region of substrate 110 is dotted with a plurality of convex portions 119, and thus an increased area of contact between the back surface of substrate 110 and air can be obtained. During the rotation of substrate 110, convex portions 119 cause a turbulent flow of air near the back side of substrate 110, thus accelerating heat exchange between the air and substrate 110. Accordingly, thermal resistance can be reduced between substrate 110 and the air, and consequently, an enhanced heat dissipating effect can be obtained.

A part of substrate 110 that generates heat corresponds to phosphor 111 irradiated with the blue light. This means that the opposite region (surface of the second region) of substrate 110 that is opposite to phosphor 111 also becomes hot. Since there is a larger temperature difference between the surface of the second region of substrate 110 and the air serving as a cooling medium, the heat can be dissipated efficiently from substrate 110 into the air. With the plurality of convex portions 119 thus provided in the second region greatly contributing to the heat dissipation, temperature of phosphor 111 can be suppressed.

In the first exemplary embodiment, as illustrated by the enlarged view of FIG. 5A, each of convex portions 119 specifically has flare shape part 119a (a filleted shape) having flat part 119 at its leading end flat surface.

As a modification of convex portion 119, flare shape part 119a may be formed with circular column part 119b connected to its leading end flat surface as shown in FIG. 5B, thus convex portion 119 has flat part 119c at its leading end flat surface.

In FIGS. 4A, 4B, 5A and 5B, thickness T of substrate 110 is 1 mm, height H of convex portion 119 is 0.6 mm, and diameter F of flat part 119c positioned at the leading end flat surface of convex portion 119 is 1 mm. Although formation of this shape can be achieved by machining, the machining is not practical in terms of cost. Accordingly, etching a substrate having a thickness of 1.6 mm so as to leave convex portions 119 unetched while removing their peripheral portion is an easy process that is feasible at low cost. This process is more advantageous in terms of cost in that a plurality of substrates can undergo this process all together. Here, because of limitations of the process, arrangement pitch P of convex portions 119 is preferably such that the following relationship holds true:

$$P > H \times 2 + F$$

By having convex portions 119 meeting such a condition, a surface area of the second region (external to a broken line in FIG. 3B) on the substrate back surface that is shown in FIG. 3B can be increased by 10% to 30%.

Substrate 110 having such a structure decrease temperature of phosphor 111 by 9% to 10% compared with a flat plate.

It is to be noted that although phosphor 111 is formed by mixing the phosphor powder and the thermosetting resin and fixing the mixture on substrate 110, phosphor 111 is not limited to this type. For example, phosphor 111 formed on substrate 110 may be made of an inorganic material. Alternatively, bonding an inorganic material to substrate 110 with an organic adhesive even holds promise of a similar effect.

Second Exemplary Embodiment

With reference to FIGS. 6 to 9, a description will be given hereinafter of an illumination apparatus using a phosphor wheel according to the second exemplary embodiment.

Figure 6:
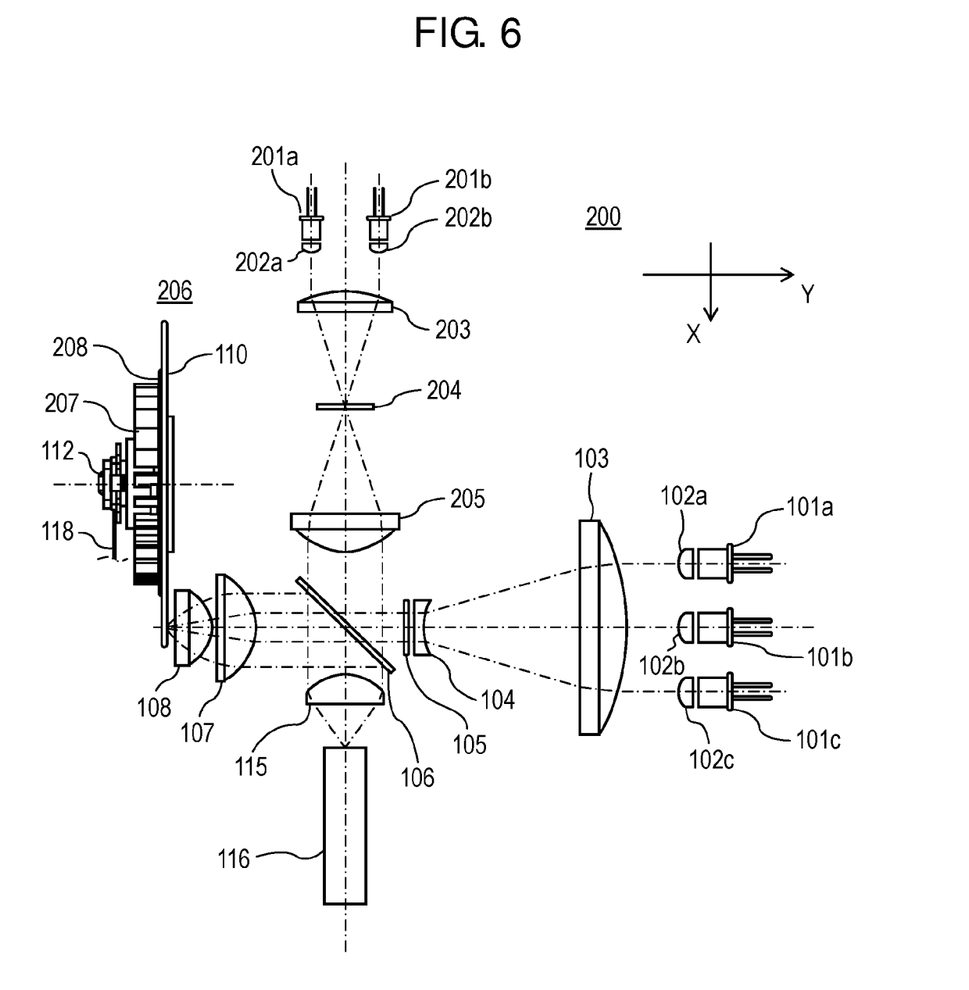
FIG. 6 illustrates an illumination apparatus using a phosphor wheel according to a second exemplary embodiment.
Figure 7:
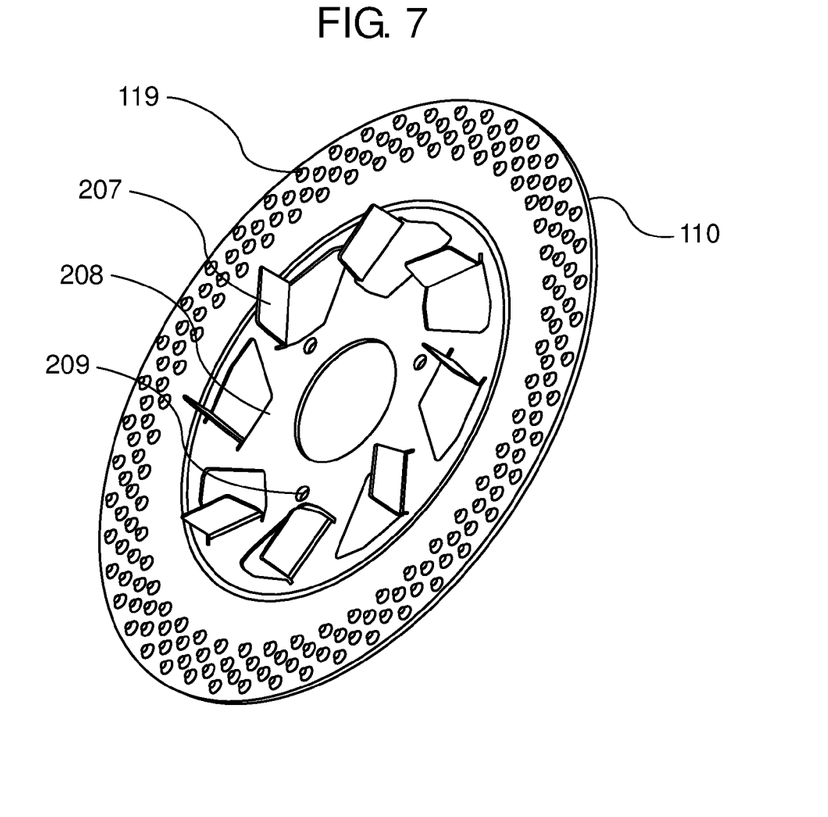
FIG. 7 is a perspective view illustrating a back side of a substrate of the phosphor wheel according to the second exemplary embodiment.
Figure 8:
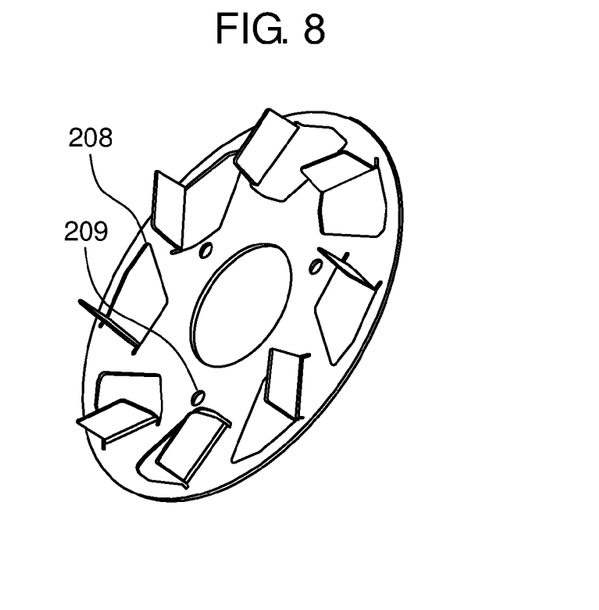
FIG. 8 is a perspective view of a fan member.
Figure 9:
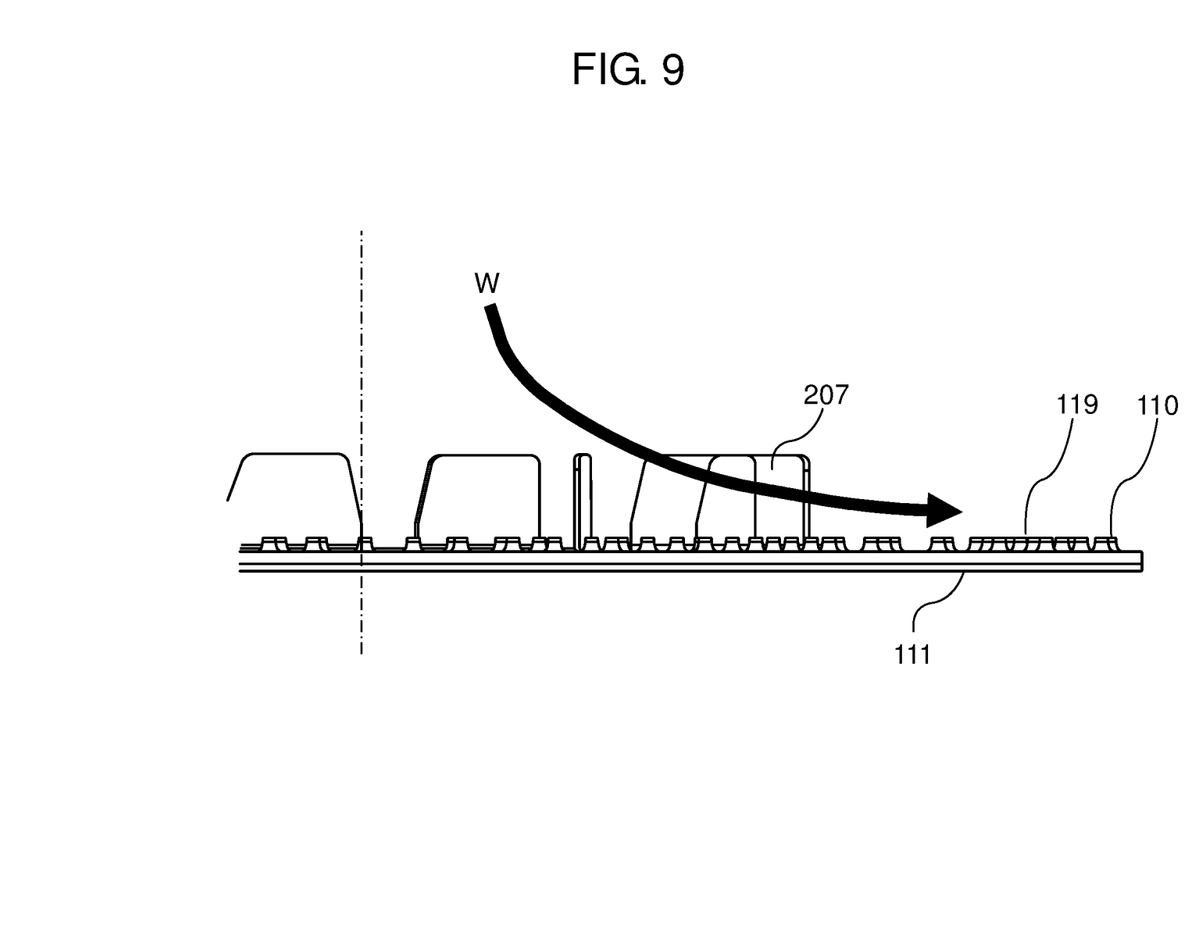
FIG. 9 illustrates a flow of air with respect to the phosphor wheel according to the second exemplary embodiment.

FIG. 6 illustrates a structure of illumination apparatus 200 according to the second exemplary embodiment. FIG. 7 is a perspective view illustrating a back side of the phosphor wheel. FIG. 8 is an enlarged view of a fan member. FIG. 9 illustrates a flow of air on a back side of a substrate of the phosphor wheel. In FIGS. 6 to 9, components similar to those in the first exemplary embodiment have the same reference marks, and repeated descriptions are omitted.

An optical configuration of the second exemplary embodiment basically uses the optical configuration of the first exemplary embodiment and incorporates an optical system for obtaining blue light as an addition. Details are as follows.

Blue light emitted in a positive X direction from blue laser diodes 201a, 201b used as a blue light source is collimated by collimating lenses 202a, 202b. The blue light collimated is concentrated on diffusion plate 204 by lens 203. The blue light is diffused by diffusion plate 204 and becomes substantially parallel through lens 205. The blue light transmitted through lens 205 is incident on dichroic mirror 106. Dichroic mirror 106 transmits blue light and reflects visible light other than the blue light.

Accordingly, the blue light thus transmitted through dichroic mirror 106 in the positive X direction is incident on lens 115. On the other hand, light emitted from blue laser diodes 101a, 101b, 101c is incident on phosphor wheel 206 in the same manner as in the first exemplary embodiment. Yellow light emitted from phosphor 111 is thereafter reflected by dichroic mirror 106 to be directed in the positive X direction, thus being combined with the blue light to form white light. The white light is concentrated on an incidence surface of rod integrator 116 that is disposed on an emission surface side of lens 115 and has a rectangular aperture.

In this way, the white light can be obtained from blue laser diodes 101a, 101b, 101c, 201a, 201b. Even with this configuration, emitted light can be obtained from an emission surface of rod integrator 116. An optical system is provided next to the emission surface side of rod integrator 116, and the emitted light is brought into incidence on this optical system, as needed. It is to be noted that a lens array formed of rectangular lenses may be used in place of lens 115 and rod integrator 116.

Next, a structure of phosphor wheel 206 of the second exemplary embodiment is detailed. Here also phosphor 111 is formed on one surface of substrate 110 to have the ring shape. Specifically, ring-shaped phosphor 111 is formed to have a predetermined width on a circumference spaced a predetermined distance away from a center of substrate 110. Phosphor 111 is formed in the same manner as in the first exemplary embodiment.

FIG. 7 is a perspective view illustrating the back side of substrate 110 according to the second exemplary embodiment. The back side of substrate 110 is mounted with rotor 117a of motor 112 for phosphor wheel 206 and is also mounted with fan member 208 shown in FIG. 8. This fan member 208 has a plurality of blades 207 that is formed by bending a sheet metal made of stainless steel. As shown in FIG. 7, when mounted to substrate 110, blades 207 of fan member 208 are provided substantially in a radial direction of substrate 110 inwardly of convex portions 119 provided in a second region of substrate 110. Fan member 208 and substrate 110 are fixed to each other by screws (not shown in the drawing) inserted into respective screw holes 209 from a front side of substrate 110. In the present exemplary embodiment, rotor 117a also is fixed by the same screws. In other words, fan member 208 and rotor 117a are fixed to substrate 110 by the same screws.

Fan member 208 thus rotates integrally with substrate 110 of phosphor wheel 206. As substrate 110 is rotated by motor 112, blades 207 of fan member 208 rotate, thus causing a flow of air toward convex portions 119.

Fan member 208 intended for cooling in phosphor wheel 206 of the present exemplary embodiment is formed by subjecting the sheet metal of stainless steel to sheet metal working. Specifically, cuts are made along respective parts of a flat plate made of stainless steel, and those parts are bent as shown in FIG. 8, thus forming blades 207. In this way, fan member 208 can be formed at low cost.

Phosphor wheel 206 of the present exemplary embodiment has substrate 110 and fan member 208 that are formed separately but are integral with each other by being fixed together by the screws. Fan member 208 may be slightly distorted as a whole as a result of stainless steel bending performed for the formation of blades 207. On the other hand, substrate 110 is preferably as flat as possible so that a distance between phosphor 111 and second lens 108 is constant in any rotating position of substrate 110. This is for preventing brightness variations and focal variations that result from variations in the distance between phosphor 111 and second lens 108. Because substrate 110 and fan member 208 are formed separately as described above, low-cost bending can be used to make fan member 208.

Fan member 208 of the second exemplary embodiment rotates integrally with substrate 110 of phosphor wheel 206, so that the flow of air is generated from fan member 208 toward substrate 110 as shown by arrow W of FIG. 9. With convex portions 119 provided in the region exposed to this flow of air, a turbulent flow is generated around convex portion 119. In this way, efficiency of heat exchange can be improved at convex portions 119. By having this structure, substrate 110 can suppress heat generation by about 20% as compared with a flat plate.

It is to be noted that material for fan member 208 here is stainless steel but is not limited to this, and any thin material enabling formation of fan member 208 may be used for fan member 208. For example, an iron plate or a copper plate may be used as the material for fan member 208 that may coated. With the use of the copper plate in particular, high heat conductivity can be achieved. However, in the structure of the present disclosure, convex portions 119 formed on an opposite side of phosphor 111 are highly efficient in heat exchange. This means that heat conductivity of fan member 208 has a small contribution to dissipation of heat from phosphor 111. Accordingly, even with the use of stainless steel that is low-cost and excellent in durability compared to the copper plate, high efficiency of heat dissipation can be obtained.

Third Exemplary Embodiment

Figure 10:
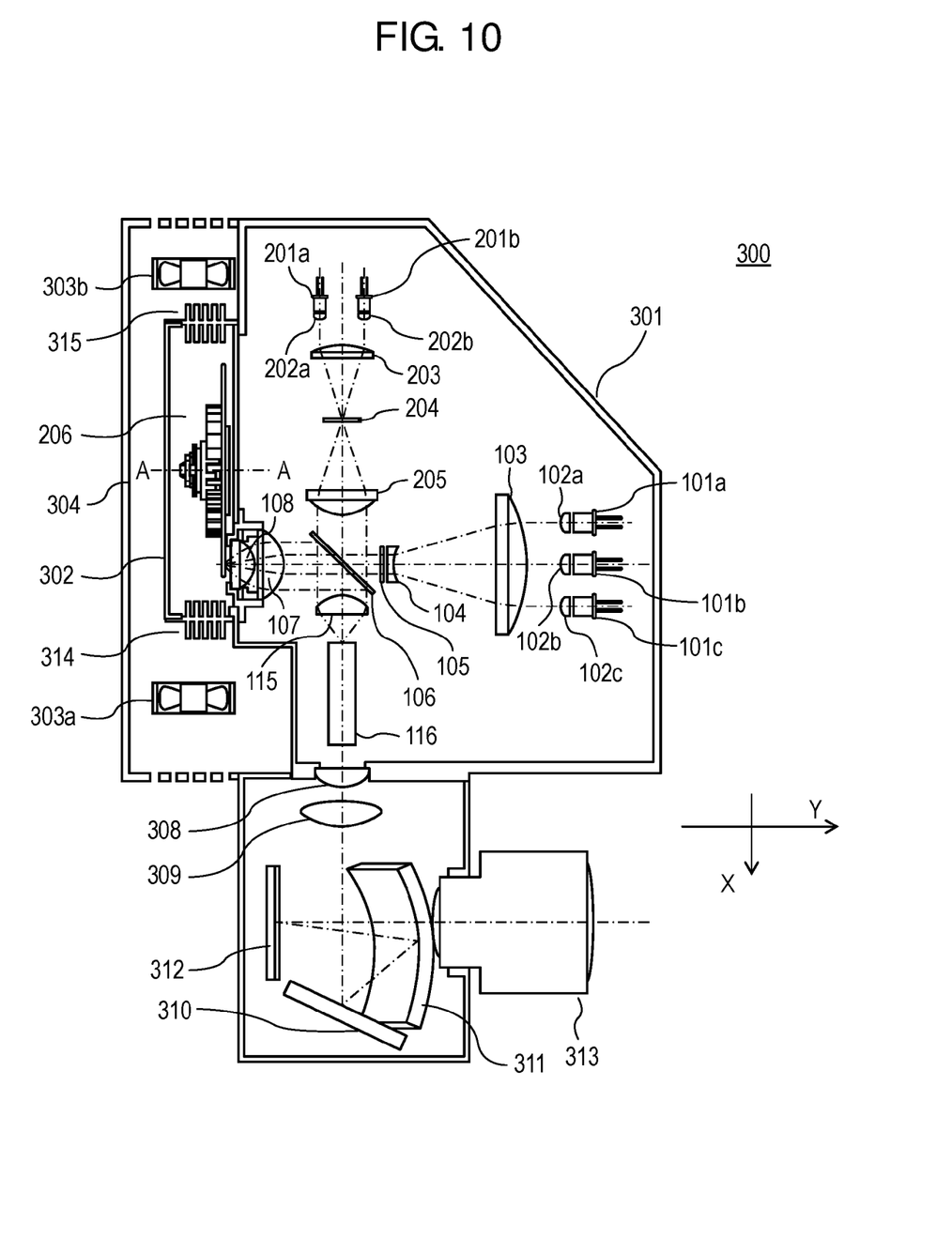
FIG. 10 illustrates a structure of a projection type image display apparatus according to a third exemplary embodiment.

FIG. 10 illustrates a configuration of an optical system included in projection type image display apparatus 300 using the phosphor wheel disclosed in the second exemplary embodiment. In FIG. 10, components similar to those in FIG. 6 have the same reference marks. Projection type image display apparatus 300 of the present exemplary embodiment uses Digital Mirror Device (DMD) 312 as an optical modulator.

In the third exemplary embodiment, a dustproof structure is incorporated for protecting illumination apparatus 200 of the second exemplary embodiment against dust. Dustproof housing 301 is a sealed housing for accommodating optical elements such as blue laser diodes and lenses in sealed condition. Dustproof housing 302 accommodates phosphor wheel 206. Housing 304 accommodates cooling fans 303a, 303b that are used for cooling dustproof housing 302. A large amount of heat is dissipated particularly around phosphor wheel 206. For this reason, phosphor wheel 206 is separated from others and is cooled by outside air. In this way, efficiency of heat exchange is improved at phosphor wheel 206.

Figure 11:
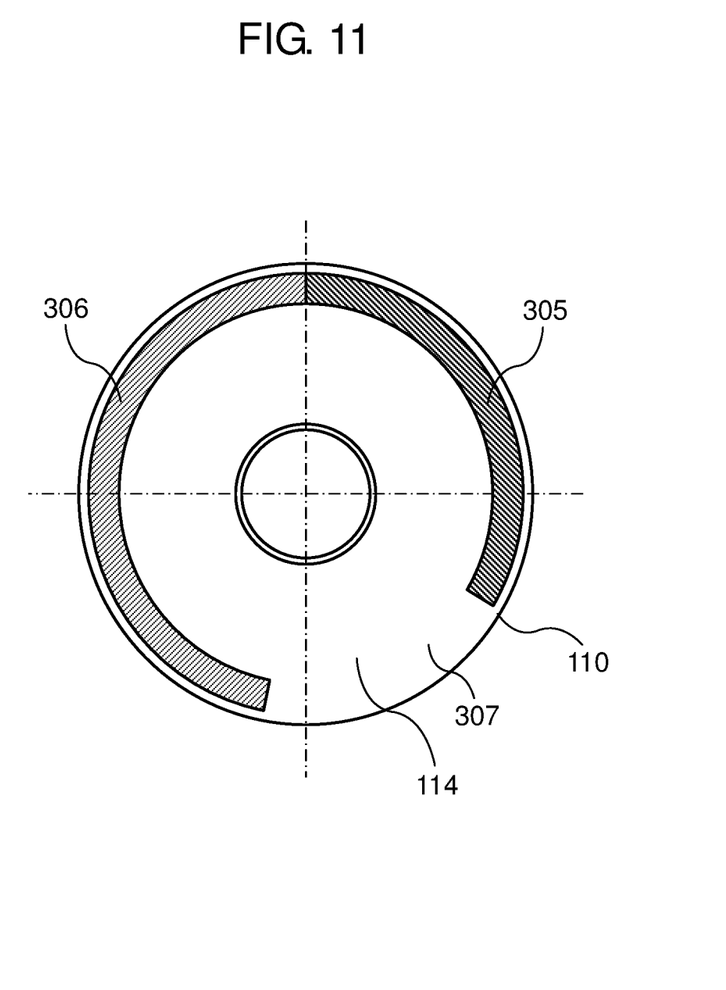
FIG. 11 is a front view of a substrate of a phosphor wheel according to the third exemplary embodiment.

FIG. 11 illustrates a phosphor pattern of phosphor wheel 206 that is used in the present exemplary embodiment. In the present exemplary embodiment, the phosphor pattern differs from that of phosphor 111 of the first exemplary embodiment in that green phosphor 305, red phosphor 306 and non-phosphor segment 307 are formed circumferentially. Non-phosphor segment 307 is not formed with any phosphor.

Blue light emitted in a negative Y direction from blue laser diodes 101a, 101b, 101c used as an excitation light source is collimated by collimating lenses 102a, 102b, 102c. Lens 103 and lens 104 that form an afocal optical system converge the blue light collimated, thus bringing the blue light into incidence on diffusion plate 105. The blue light incident on diffusion plate 105 is diffused by diffusion plate 105. The diffused blue light is incident on dichroic mirror 106. Dichroic mirror 106 transmits blue light and reflects visible light other than the blue light.

Dichroic mirror 106 is disposed to incline at 45 degrees to an optical axis. The blue light from diffusion plate 105 thus passes through dichroic mirror 106. The blue light then passes through first lens 107 and second lens 108 and is applied to ring-shaped phosphor 111 formed on substrate 110 of phosphor wheel 206. Substrate 110 of phosphor wheel 206 is driven by motor 112 to rotate, so that phosphor 111 has a large area associated with fluorescence. Consequently, increase in temperature of phosphor 111 can be suppressed even when the applied light has high energy. Green phosphor 305 is a phosphor that emits green fluorescence by having the blue light as excitation light. Red phosphor 306 is a phosphor that emits red fluorescence by having the blue light as excitation light. The green light and the red light emitted in the negative Y direction are each reflected by highly reflective film 114 provided on substrate 110, thus being redirected in a positive Y direction. The green light and the red light are thus incident on dichroic mirror 106 positioned in the positive Y direction. Since dichroic mirror 106 reflects the visible light other than the blue light, the incident green light and the incident red light are each reflected by dichroic mirror 106, thus travelling in a positive X direction. The green light and the red light that are incident on lens 115 are each concentrated on an incidence surface of rod integrator 116 by lens 115. Rod integrator 116 is disposed ahead of lens 115, and its incidence surface is rectangular.

Blue laser diodes 201a, 201b are used as a blue light source. Blue light emitted in the positive X direction from blue laser diodes 201a, 201b is collimated by collimating lenses 202a, 202b. The collimated blue light is concentrated by lens 203, thus being incident on diffusion plate 204. The blue light is diffused by diffusion plate 204 and becomes substantially parallel through lens 205. The blue light is then transmitted through dichroic mirror 106.

The green light obtained from green phosphor 305, the red light obtained from red phosphor 306, and the blue light emitted from blue laser diodes 201a, 201b are combined into white light. In this way, the white light can be obtained from blue laser diodes.

It is to be noted that illumination timing can differ between blue laser diodes 101a, 101b, 101c that irradiate phosphor 111 with the excitation light and blue laser diodes 201a, 201b that are used as the blue light source. When green phosphor 305 and red phosphor 306 of phosphor 111 are each irradiated with the excitation light, blue laser diodes 101a, 101b, 101c illuminate, while blue laser diodes 201a, 201b are turned off. When non-phosphor segment 307 is irradiated with the excitation light, blue laser diodes 101a, 101b, 101c are turned off, while blue laser diodes 201a, 201b illuminate. In this way, emitted light from an emission surface of rod integrator 116 can be changed to red light, green light or blue light in a predetermined cycle.

The light emitted from rod integrator 116 passes through lens 308 and lens 309 that form a relay optical system and is reflected by mirror 310 and mirror 311, thus being brought into incidence on DMD 312 that is an image display element. The light incident on DMD 312 is modulated in accordance with an image signal by DMD 312, so that image light is generated. The image light generated by DMD 312 is emitted in the positive Y direction, is enlarged by projection lens 313 that is a projection optical system and is then projected on a screen that is not shown in the drawing.

Next, dustproof housing 302 accommodating phosphor wheel 206 and its peripheral structure are described.

Dustproof housing 302 has, at its upper and lower sides, respective heat sinks 314, 315 that are each formed of a plurality of fins and are provided as heat exchanging elements. Substrate 110 is placed inside dustproof housing 302 so as to be rotatable on axis A-A serving as an axis of rotation. As motor drives substrate 110 to rotate, fan member 208 rotates together with substrate 110, so that a flow of air is generated within dustproof housing 302 by blades 207 of fan member 208. On inner sides of heat sinks 314, 315, this flow of air is preferably directed along surfaces of the plurality of fins forming heat sinks 314, 315. Accordingly, the fins of heat sink 314 and the fins of heat sink 315 are provided to be parallel to a surface of substrate 110 in the present exemplary embodiment.

Cooling fans 303a, 303b are provided near the respective upper and lower sides of dustproof housing 302. Cooling fans 303a, 303b generate a flow of air along the surfaces of the plurality of fins forming heat sinks 314, 315. In this way, heat sinks 314, 315 perform heat exchange with improved efficiency. The air within housing 302 that is heated by heat generated during irradiation of phosphor 111 with the excitation light is thus generated by blades 207 of fan member 208 to flow along the surfaces of the fins of heat sinks 314, 315, so that efficient outward heat dissipation is effected by heat sinks 314, 315.

With the above structure, phosphor wheel 206 can be protected against dust and the heat of phosphor 111 can be dissipated efficiently into the outside air.

The above exemplary embodiments are described as examples of a technique of the present disclosure but do not limit the technique of the present disclosure. The technique of the present disclosure is also applicable to an exemplary embodiment including changes, replacements, additions, and omissions. Moreover, the components described in the above exemplary embodiments can be combined in a new exemplary embodiment.

The present disclosure is applicable to a phosphor wheel of a projection type image display apparatus.

What is claimed is:

1. A phosphor wheel comprising a disk-shaped substrate made of a heat conductive material, the substrate including a phosphor that emits light by irradiation with excitation light in a first region along an outer periphery of one surface of the substrate, and a plurality of convex portions dotting a second region of another surface of the substrate, the second region corresponding to and opposite to the first region in which the phosphor is disposed,
wherein the substrate is driven to rotate about an axis of rotation.

2. The phosphor wheel according to claim 1, wherein each of the plurality of convex portions is formed into a flare shape.

3. The phosphor wheel according to claim 1, wherein the plurality of convex portions is formed in a process including at least etching.

4. The phosphor wheel according to claim 1, wherein when an arrangement pitch of the plurality of convex portions is P, a height of each of the plurality of convex portions is H, and a diameter of a flat part positioned at a leading end flat surface of each of the plurality of convex portions is F, the following relationship is satisfied:

$$P > H \times 2 + F.$$

5. The phosphor wheel according to claim 1, wherein each of the plurality of convex portions includes a flat part at a leading end flat surface of convex portions and a surface area of the second region is increased by 10% to 30% by the plurality of convex portions formed.

6. The phosphor wheel according to claim 1, wherein at least a treatment for effecting reflection of fluorescence of the phosphor is performed between the substrate and the phosphor.

7. The phosphor wheel according to claim 1, further comprising a fan member having a plurality of blades extending in a radial direction of the substrate, the plurality of blades being shorter than a distance between the axis of rotation and a position where the phosphor is disposed,
wherein the fan member is provided to rotate integrally with the substrate.

8. The phosphor wheel according to claim 7, wherein the fan member is formed by bending a sheet metal made of a material different from the heat conductive material for the substrate.

9. The phosphor wheel according to claim 8, wherein the material for the fan member is stainless steel.

10. The phosphor wheel according to claim 1, wherein at least the substrate is rotatably accommodated in a sealed housing and the sealed housing includes heat exchanging elements inside and outside the sealed housing.

11. The phosphor wheel according to claim 10, wherein the heat exchanging element is a heat sink.

12. The phosphor wheel according to claim 11, wherein a fan member provided to the phosphor wheel is disposed so that the fan member generate an air flow flowing along surfaces of a plurality of fins forming the heat sink.

13. An illumination apparatus comprising:
an excitation light source apparatus including a semiconductor laser for emitting laser light having an excitation wavelength for the phosphor, and a collimating lens disposed ahead of the semiconductor laser;
an excitation optical system for concentrating light from the excitation light source apparatus; and
the phosphor wheel according to claim 1.

14. A projection type image display apparatus comprising:
the illumination apparatus according to claim 13;
an image display element capable of modulating incident light in accordance with an image signal;
a relay optical system for guiding light from the illumination apparatus to the image display element; and
a projection optical system capable of enlarged projection of an image displayed on the image display element.

* * * * *